(12) United States Patent
Seol

(10) Patent No.: US 11,072,532 B2
(45) Date of Patent: Jul. 27, 2021

(54) METHOD FOR MANUFACTURING ACTIVATED CARBON FOR ELECTRODE MATERIAL

(71) Applicant: TOKAI CARBON KOREA CO., LTD, Gyeonggi-do (KR)

(72) Inventor: Chang Wook Seol, Gyeonggi-do (KR)

(73) Assignee: TOKAI CARBON KOREA CO., LTD, Gyeonggi-do (KR)

( * ) Notice: Subject to any disclaimer, the term of this patent is extended or adjusted under 35 U.S.C. 154(b) by 0 days.

(21) Appl. No.: 16/956,009

(22) PCT Filed: Nov. 23, 2018

(86) PCT No.: PCT/KR2018/014500
§ 371 (c)(1),
(2) Date: Jun. 19, 2020

(87) PCT Pub. No.: WO2019/124777
PCT Pub. Date: Jun. 27, 2019

(65) Prior Publication Data
US 2020/0317528 A1 Oct. 8, 2020

(30) Foreign Application Priority Data
Dec. 19, 2017 (KR) .................. 10-2017-0175062

(51) Int. Cl.
*C01B 32/348* (2017.01)
*C01B 32/318* (2017.01)
*C01B 32/378* (2017.01)
*C01B 32/336* (2017.01)
*H01G 11/34* (2013.01)
(Continued)

(52) U.S. Cl.
CPC .......... *C01B 32/348* (2017.08); *C01B 32/318* (2017.08); *C01B 32/336* (2017.08); *C01B 32/378* (2017.08); *H01G 11/34* (2013.01); *H01M 4/587* (2013.01);
(Continued)

(58) Field of Classification Search
CPC ... C01B 32/348; C01B 32/318; C01B 32/378; C01B 32/336; C01B 32/342; H01G 11/34; H01M 4/587; H01M 10/0525; C01P 2006/40; C01P 2006/80; C01P 2006/12; C01P 2004/61; Y02E 60/10; H01B 1/04
See application file for complete search history.

(56) References Cited

U.S. PATENT DOCUMENTS

2015/0071847 A1 3/2015 Ishikawa et al.
2019/0295782 A1 9/2019 Kobayashi et al.

FOREIGN PATENT DOCUMENTS

AU 200720318 A1 2/2008
CN 104203816 A 12/2014
(Continued)

OTHER PUBLICATIONS

English Translation of International Search Report for International Patent Application No. PCT/KR2018/014500, dated Feb. 26, 2019, 2 pages.

*Primary Examiner* — Richard M Rump
(74) *Attorney, Agent, or Firm* — Armstrong Teasdale LLC

(57) ABSTRACT

Described herein is a method for manufacturing an activated carbon for an electrode material, the method including a step of heat-treating an activated carbon material in an atmosphere containing a chlorine-containing gas, wherein the content of metal impurities contained in the activated carbon material after the heat treating step is 0.1 to 20 ppm.

12 Claims, 1 Drawing Sheet

(51) Int. Cl.
*H01M 4/587* (2010.01)
*H01M 10/0525* (2010.01)

(52) U.S. Cl.
CPC ..... *H01M 10/0525* (2013.01); *C01P 2006/40* (2013.01); *C01P 2006/80* (2013.01)

(56) References Cited

FOREIGN PATENT DOCUMENTS

| | | |
|---|---|---|
| JP | H0824636 A | 1/1996 |
| JP | 2004107814 A | 4/2004 |
| JP | 2008037733 A | 2/2008 |
| JP | 2013042146 A | 2/2013 |
| JP | 2015151324 A | 8/2015 |
| JP | 2016076673 A | 5/2016 |
| JP | 2017088443 A | 5/2017 |
| JP | 2017212433 A | 11/2017 |
| KR | 20150054030 A | 5/2015 |
| KR | 20150132711 A | 11/2015 |
| KR | 20170128737 A | 11/2017 |
| TW | 201236039 A | 9/2012 |

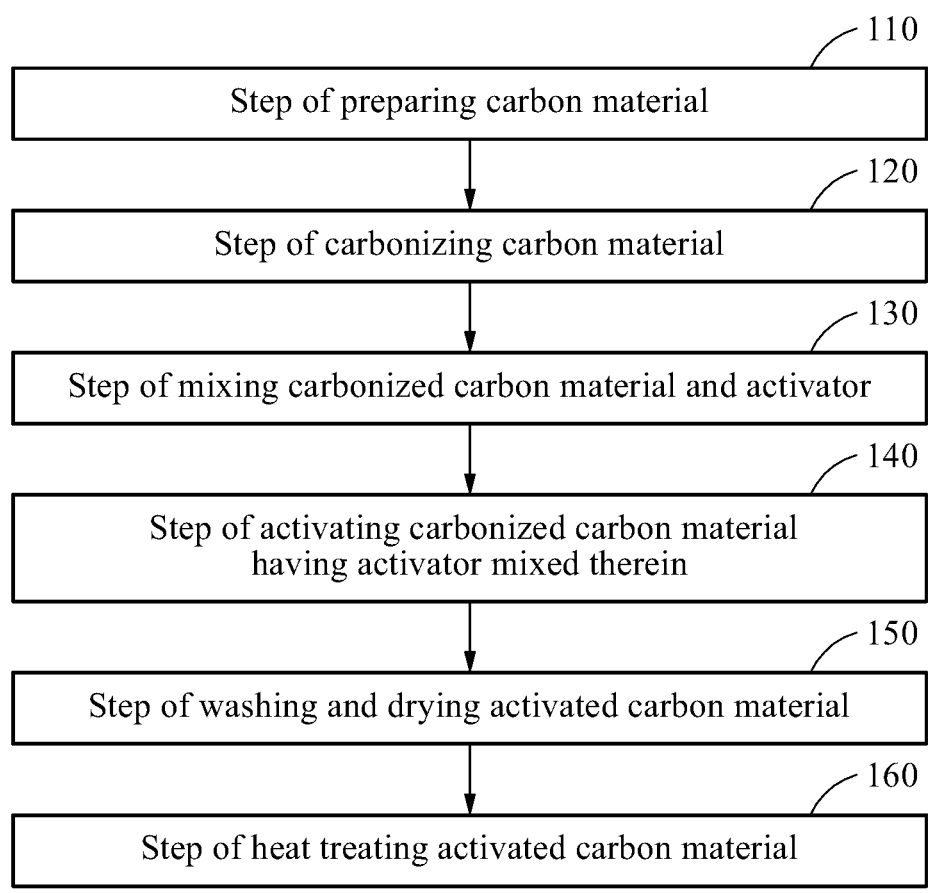

METHOD FOR MANUFACTURING ACTIVATED CARBON FOR ELECTRODE MATERIAL

CROSS-REFERENCE TO RELATED APPLICATIONS

This application is a National Phase Application of PCT International Application No. PCT/KR2018/014500, having an International Filing Date of Nov. 23, 2018, which claims priority to Korean Patent Application No. 10-2017-0175062, filed Dec. 19, 2017, each of which is hereby incorporated by reference in its entirety.

TECHNICAL FIELD

The present invention relates to a method for manufacturing an activated carbon for an electrode material.

BACKGROUND ART

Various personal terminals and portable electronic devices are becoming more common with development of electrical and electronic technologies, and application fields of energy storage devices and the battery market are expanding as research on hybrid electric vehicles is actively conducted. Recently, an energy electrochemical capacitor capable of instantaneous high-output charging and discharging is being studied by overcoming shortcomings of a secondary battery having a low-output density characteristic and a conventional capacitor having a low-energy density characteristic as an electrical energy storage device. Electrochemical capacitors are divided into two types: electric double-layer capacitors and pseudocapacitors. An electric double-layer capacitor is an electrochemical capacitor that maximizes an amount of electric charges stored according to the electric double-layer principle, by using a porous material having a relatively high electrical conductivity such as activated carbon and having an extremely large specific surface area in contact with ions as an electrode material for a positive electrode and a negative electrode.

Development of technologies of electric double-layer capacitors is divided into fields of an activated carbon electrode, an electrolyte, a separation membrane manufacturing technology, and the like. Technology development related to activated carbon electrodes is mainly conducted for a specific surface area, a pore size distribution, a pore volume, and an electrical conductivity, and development is being conducted to have characteristics such as uniform voltage, an adhesion to a current collector, a low internal resistance, and the like. Recently, many studies are being conducted to find out a correlation between electrochemical characteristics and a pore structure of an activated carbon that is an electrode material of an electric double-layer capacitor. According to the research results, it is known that a charging capacity generally increases as a specific surface area increases. Also, it has been reported that when a predetermined specific surface area is secured, an increase in a fraction of mesopores has a great influence on a charging capacity. Accordingly, recently, various studies have been conducted on technologies of manufacturing an activated carbon for an electrode material to enhance a capacitance through a method of securing a fraction of mesopores while increasing a specific surface area of the activated carbon to the maximum level. However, although a heat treatment scheme is applied to reduce oxygen and metal impurities of the activated carbon, the specific surface area is reduced by 20% to 30% due to a destruction of a pore structure, and the like, by such a heat treatment process.

DISCLOSURE OF THE INVENTION

Technical Subject

One or more example embodiments of the present invention provide, as a technology developed to meet the above-described requirements, a method for manufacturing an activated carbon for an electrode material which may effectively remove impurities while minimizing a decrease in a specific surface area of the activated carbon in a heat treatment process.

However, the problems to be solved by the present invention are not limited to the aforementioned problems, and other problems to be solved, which are not mentioned above, will be clearly understood by a person having ordinary skill in the art from the following description.

Technical Solution

According to an example embodiment of the present invention, there is provided a method for manufacturing an activate carbon for an electrode material, the method including: heat-treating an activated carbon material in an atmosphere containing a chlorine-containing gas, wherein a content of metal impurities in the activated carbon material after the heat-treating of the activated carbon material ranges from 0.1 ppm to less than or equal to 20 ppm.

According to an example embodiment of the present invention, the method may include preparing a carbon material; carbonizing the carbon material; mixing the carbonized carbon material and an activator; activating the carbonized carbon material having the activator mixed therein; washing and drying the activated carbon material; and heat-treating the activated carbon material in an atmosphere containing a chlorine-containing gas, after the washing and drying of the activated carbon material.

According to an example embodiment of the present invention, in the mixing of the carbonized carbon material and the activator, the activator may be an alkali hydroxide and may be added in a weight ratio of 1 to 5 based on the carbonized carbon material.

According to an example embodiment of the present invention, the activating of the carbonized carbon material may be performed at an activation temperature of 500° C. to 1000° C.

According to an example embodiment of the present invention, after the activating of the carbonized carbon material, a content of the activator in the carbonized carbon material may be 500 ppm or less.

According to an example embodiment of the present invention, the washing and drying of the activated carbon material may be performed by at least one method selected from the group consisting of acid washing, distilled water washing and inert gas washing.

According to an example embodiment of the present invention, the washing and drying of the activated carbon material may include drying the activated carbon material at a temperature of 50° C. to 200° C.

According to an example embodiment of the present invention, after the washing and drying of the activated carbon material, pH of the activated carbon material may range from 6.5 to 7.5.

According to an example embodiment of the present invention, the chlorine-containing gas may include at least one selected from the group consisting of HCl, $Cl_2$, $CHCl_3$, $ClO_2$, $BCl_3$, $SiCl_4$, $CCl_4$, $CHCl_3$, $COCl_2$, $CHCl_3$ and $CH_2Cl_2$.

According to an example embodiment of the present invention, the chlorine-containing gas may be mixed with an inert gas to form an atmosphere. The chlorine-containing gas may be included in an amount of 1 to 50% (v/v) in gases forming the atmosphere.

According to an example embodiment of the present invention, the heat-treating of the activated carbon material may be performed at a temperature of 500° C. to 1000° C.

According to an example embodiment of the present invention, the method may further include, after the carbonizing of the carbon material, grinding the carbonized carbon material to an average particle size of 3 µm to 20 µm.

According to an example embodiment of the present invention, a specific surface area of the activated carbon material after the heat-treating of the activated carbon material may be reduced by 20% or less in comparison to the specific surface area of the activated carbon material before the heat-treating of the activated carbon material.

According to an example embodiment of the present invention, a content of oxygen in the activated carbon material after the heat-treating of the activated carbon material may be 1% or less.

According to an example embodiment of the present invention, the content of the metal impurities in the activated carbon material after the heat-treating of the activated carbon material may range from 0.1 ppm to less than or equal to 20 ppm.

Effect of the Invention

The present invention relates to a method for manufacturing an activated carbon for an electrode material which may prevent a decrease in a specific surface area and effectively wash oxygen and metal impurities by applying washing using a chlorine-containing gas.

BRIEF DESCRIPTION OF THE DRAWINGS

FIG. 1 is a flowchart illustrating an example of a method for manufacturing an activated carbon by the present invention, according to an example embodiment of the present invention.

BEST MODE FOR CARRYING OUT THE INVENTION

Hereinafter, example embodiments will be described in detail with reference to the accompanying drawing. Like reference numerals illustrated in the drawings refer to like constituent elements throughout the specification.

Various modifications may be made to the following example embodiments. However, it should be understood that these example embodiments are not construed as limited to the illustrated forms and include all changes, equivalents or alternatives within the idea and the technical scope of this disclosure. The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Also, when describing the example embodiments with reference to the accompanying drawing, like reference numerals refer to like constituent elements and a repeated description related thereto will be omitted. In the description of example embodiments, detailed description of well-known related structures or functions will be omitted when it is deemed that such description will cause ambiguous interpretation of the example embodiments.

The present invention relates to a method for manufacturing an activated carbon. The method is described with reference to FIG. 1 according to an example embodiment of the present invention. FIG. 1 is a flowchart illustrating an example of a method for manufacturing an activated carbon by the present invention, according to an example embodiment of the present invention. The method of FIG. 1 may include step 110 of preparing a carbon material; step 120 of carbonizing the carbon material; step 130 of mixing the carbonized carbon material and an activator; step 140 of activating the carbonized carbon material having the activator mixed therein; step 150 of washing and drying the activated carbon material; and step 160 of heat-treating the activated carbon material.

As an example of the present invention, step 110 of preparing a carbon material is a step of preparing a carbon material that may be used as a main material of an activated carbon. For example, the carbon material may include at least one selected from the group consisting of pitch, coke, isotropic carbon, anisotropic carbon, graphitizable carbon, and non-graphitizable carbon.

As an example of the present invention, step 120 of carbonizing the carbon material is a step of removing impurities and/or elements excluding a carbon component from the carbon material at a high temperature to increase a quality (for example, a purity), a performance and a crystallinity of the activated carbon.

For example, in step 120 of carbonizing the carbon material, components other than the carbon component may be evaporated in the form of oil vapor, and when a carbonization is completed, the carbonized carbon material of which a weight is reduced by about 3% to 40% in comparison to the prepared carbon material even though there are differences depending on the original components may be obtained.

For example, in step 120 of carbonizing the carbon material, a carbonizing temperature may range from 600° C. to 1200° C.; from 600° C. to 1000° C.; from 600° C. to 900° C.; or from 700° C. to 900° C. When the carbonizing temperature is within the above-described temperature ranges, an activated carbon capable of realizing a high XRD maximum peak intensity, a high crystallinity, and a high capacitance as an electrode of an energy storage device may be provided.

For example, step 120 of carbonizing the carbon material may be performed for 10 minutes to 24 hours; 30 minutes to 24 hours; 1 hour to 24 hours; or 5 hours to 12 hours in an atmosphere containing at least one of air, oxygen, carbon and an inert gas. The inert gas may include, for example, an argon gas, a helium gas, a hydrogen gas, a nitrogen gas, and the like.

As an example of the present invention, after step 120 of carbonizing the carbon material, the method may further include a step (not shown) of grinding the carbonized carbon material. For example, in the step of grinding the carbonized carbon material, the carbonized carbon material may be ground and pulverized to an average particle size of 3 μm to 20 μm. When the particle size of the carbonized carbon material is within the above-described particle size range, an activator may be properly adsorbed onto a surface of the carbon material, and an activation area of the carbon material may be increased.

For example, in the step of grinding the carbonized carbon material, mechanical milling may be used. The mechanical milling may include, for example, at least one selected from the group consisting of a rotor mill, mortar milling, ball milling, planetary ball milling, jet milling, bead milling and attrition milling.

As an example of the present invention, step 130 of mixing the carbonized carbon material and an activator is a step of mixing the activator and the carbon material that is carbonized in step 120 of carbonizing the carbon material.

For example, the activator may be added in a weight ratio of 1 to 5 based on the carbonized carbon material. When a weight ratio of the activator to the carbonized carbon material is within the above-described weight ratio range, an activated carbon having an enhanced performance, such as a capacitance, and a low specific surface area may be provided.

For example, the activator may be an alkali hydroxide, and may be, for example, MOH (M=alkali metal of Li, Na, K or Cs.). Desirably, the activator may be KOH, NaOH, and the like.

For example, the alkali hydroxide may be added as a mixture to increase a specific surface area by adjusting mesopores of the activated carbon in an activation process, and a mixing ratio of one alkali hydroxide to the remaining alkali hydroxides may be 1:0.1 to 1 (w/w). Desirably, a mixing ratio of an alkali hydroxide with a relatively high reactivity to an alkali hydroxide with a relatively low reactivity may be 1:0.1 to 1 (w/w). When it is within the above-described mixing ratio, a large specific surface area may be formed during an alkali activation.

As an example of the present invention, step 140 of activating the carbonized carbon material having the activator mixed therein is a step of applying heat (or a heat treatment process) to a mixture of the carbonized carbon material and the activator, decomposing the activator, activating a surface of the carbonized carbon material, and forming an activated carbon material (or an activated carbon).

For example, step 140 of activating the carbonized carbon material having the activator mixed therein may be performed at an activation temperature of 500° C. or greater; of 500° C. to 1200° C.; of 500° C. to 1000° C.; or of 600° C. to 800° C. When the activation temperature is within the above-described temperature ranges, an activated carbon with a large specific surface area and an excellent crystallinity and capable of properly forming micropores and preventing a particle size from increasing due to agglomeration of activated carbons may be provided.

For example, step 140 of activating the carbonized carbon material having the activator mixed therein may be carried out for 10 minutes to 24 hours; 30 minutes to 24 hours; 1 hour to 24 hours; or 5 hours to 12 hours. When step 140 is performed within the above-described time ranges, an activation may be sufficiently performed, an agglomeration between activated carbons due to an exposure for a long period of time at a high temperature may be prevented.

For example, step 140 of activating the carbonized carbon material having the activator mixed therein may be carried out in an atmosphere containing at least one of air, oxygen and an inert gas. The inert gas may include, for example, an argon gas, a helium gas, hydrogen, nitrogen, and the like.

As an example of the present invention, the method may further include a step (not shown) of grinding the activated carbon, after step 140 of activating the carbonized carbon material having the activator mixed therein. For example, in the step of grinding the activated carbon, the activated carbon may be ground to an average particle size of 3 μm to 20 μm and pulverized to fine particles.

As an example of the present invention, step 150 of washing and drying the activated carbon material is a step of washing and drying the activated carbon material to remove impurities, and the like.

For example, step 150 of washing and drying the activated carbon material may be performed by at least one method selected from the group consisting of acid washing, distilled water washing and inert gas washing.

For example, for the acid washing, an acid solution containing an inorganic acid, an organic acid or both may be applied. For example, an acid aqueous solution containing at least one selected from the group consisting of sulfuric acid, hydrochloric acid, nitric acid, acetic acid, formic acid and phosphoric acid may be applied.

For example, in step 150 of washing and drying the activated carbon material, the activated carbon material that is washed may be dried at a temperature of 50° C. to 200° C.; of 80° C. to 200° C.; or of 90° C. to 150° C. for 10 minutes or greater; 10 minutes to 40 hours; 30 minutes to 24 hours; 1 hour to 24 hours; or 5 hours to 12 hours, and may be dried in a vacuum atmosphere; or an atmosphere containing air, an inert gas or a mixture thereof.

For example, after step 150 of washing and drying the activated carbon material, pH of the activated carbon material may range from 6.5 to 7.5, and a concentration of the activator may be 50 ppm or less; or 30 ppm or less. The pH and the concentration of the activator may be numerical values after a washing process, a drying process or both the washing process and the drying process.

As an example of the present invention, step 160 of heat-treating the activated carbon material is a step of heat-treating the activated carbon material to remove impurities, and the like, after step 150 of washing and drying the activated carbon material. For example, metal impurities, oxygen (for example, an oxygen-functional group, and the like), and the like may be removed.

For example, in step 160 of heat-treating the activated carbon material, the activated carbon material may be heat-treated in an atmosphere containing a chlorine-containing gas. In other words, since the activated carbon material is heat-treated in the atmosphere containing the chlorine-containing gas, metal impurities, oxygen, and the like may be effectively removed, and a destruction of a pore structure by a heat treatment may be prevented, thereby minimizing a ratio of a decrease in a specific surface area.

For example, the chlorine-containing gas may include any gas applicable to a heat treatment of an activated carbon in a technical field of the present invention, without departing from the aspects of the present invention, and there is no limitation thereto. The chlorine-containing gas may include, for example, at least one selected from the group consisting of $HCl$, $Cl_2$, $CHCl_3$, $ClO_2$, $BCl_3$, $SiCl_4$, $CCl_4$, $CHCl_3$, $COCl_2$, $CHCl_3$ and $CH_2Cl_2$. Desirably, the chlorine-containing gas may be HCl, $Cl_2$, $CHCl_3$ and $CH_2Cl_2$.

For example, to form a heat treatment atmosphere, the chlorine-containing gas may be used alone or may be mixed with an inert gas. The chlorine-containing gas may be included in an amount of 1 to 50% (v/v); of 5 to 50% (v/v); of 5 to 40% (v/v); or of 10 to 30% (v/v) in gases forming the atmosphere. When the amount of the chlorine-containing gas is within the above-described ranges, a destruction of a pore structure due to a hydrogen gas, and the like may be prevented, to reduce a decrease in a specific surface area and to increase an efficiency of removing metal impurities, and the like, by chlorine.

For example, step 160 of heat-treating the activated carbon material may be performed at a temperature of 300° C. or greater; of 300° C. to 1000° C.; or of 500° C. to 1000° C. for 10 minutes or greater; 10 minutes to 40 hours; 30 minutes to 24 hours; 1 hour to 24 hours; or 5 hours to 12 hours. When step 160 is performed within the above-described temperature ranges and time ranges, oxygen and metal impurities may be properly removed from the activated carbon, and a decrease in a specific surface area, and the like may be prevented.

For example, after step 160 of heat-treating the activated carbon material, metal impurities may be present in an amount of 0.1 ppm to less than or equal to 20 ppm in the activated carbon material.

For example, the specific surface area of the activated carbon material after step 160 of heat-treating the activated carbon material may be reduced by 20% or less; 10% or less; or 5% or less, in comparison to the specific surface area of the activated carbon material before step 160.

For example, a content of oxygen in the activated carbon material after step 160 of heat-treating the activated carbon material may be 1% or less; may be greater than 0 to less than or equal to 1%; or may range from 0.01% to 1%.

The present invention provides an activated carbon manufactured by the method of the present invention. According to an example embodiment of the present invention, the activated carbon may have an excellent crystallinity and a large specific surface area and may include a small amount of oxygen, metal impurities, and the like, thereby enhancing an electrical conductivity, a capacitor performance, and the like.

As an example of the present invention, the activated carbon may have a specific surface area of 300 $m^2/g$ to 1500 $m^2/g$, and a micropore of the activated carbon may have an average size of 0.6 nm to 1.3 nm.

As an example of the present invention, a micropore of the activated carbon may have a volume of 0.05 $cm^3/g$ to 0.8 $cm^3/g$.

As an example of the present invention, the activated carbon may have an electrical conductivity of 3 S/cm to 10 S/cm.

As an example of the present invention, the activated carbon may be uniformly activated and a crystallinity may be increased. For example, the activated carbon may have a maximum X-ray diffraction (XRD) peak value in a range of 23° to 26° (2θ), and an energy storage device with a high capacitance may be provided due to the above increase in the crystallinity.

According to an example embodiment of the present invention, the present invention may provide an energy storage device including an activated carbon by the present invention.

As an example of the present invention, the energy storage device of the present invention may include a housing, at least one electrode including an activated carbon according to an example embodiment of the present invention; a separation membrane; and an electrolyte.

As an example of the present invention, the energy storage device may have a capacitance of 30 F/cc to 55 F/cc.

As an example of the present invention, the energy storage device may be a capacitor, a lithium secondary battery, and the like.

EXAMPLE 1

A carbide formed by carbonizing a petroleum-based Coke material for 10 hours and an activator (KOH:NaOH=1:1(w/w)) were mixed in a blender at a mass ratio of 1:5 (activated carbon:KOH). Next, the mixture was put into a crucible, heat-treated at 1000° C. for 5 hours in an inert atmosphere and activated. Next, after washing with an aqueous hydrochloric acid solution and rinsing with water were repeated three times, drying was performed at 100° C. for 40 hours. A dried activated carbon was passed through a sieve, to obtain an activated carbon.

The activated carbon was heat-treated at 1000° C. for 10 hours in an atmosphere containing HCl, hydrogen and nitrogen gases (HCl 20%, $H_2$ 10%, $N_2$ 70%) and washed.

EXAMPLE 2

An activated carbon was manufactured in the same manner as in Example 1, except that an atmosphere containing $Cl_2$, hydrogen and nitrogen gases ($Cl_2$ 20%, $H_2$ 10%, $N_2$ 70%) was applied.

EXAMPLE 3

An activated carbon was manufactured in the same manner as in Example 1, except that an atmosphere containing HCl, hydrogen and nitrogen gases (HCl 10%, $H_2$ 10%, $N_2$ 70%) was applied.

EXAMPLE 4

An activated carbon was manufactured in the same manner as in Example 1, except that an atmosphere containing HCl, hydrogen and nitrogen gases (HCl 20%, $H_2$ 10%, $N_2$ 70%) was applied.

EXAMPLE 5

An activated carbon was manufactured in the same manner as in Example 1, except that an atmosphere containing HCl, hydrogen and nitrogen gases (HCl 30%, $H_2$ 10%, $N_2$ 70%) was applied.

EXAMPLE 6

An activated carbon was manufactured in the same manner as in Example 1, except that an atmosphere containing HCl, hydrogen and nitrogen gases (HCl 60%, $H_2$ 10%, $N_2$ 70%) was applied.

COMPARATIVE EXAMPLE 1

An activated carbon was manufactured in the same manner as in Example 1, except that the activated carbon was heat-treated in an atmosphere containing hydrogen and nitrogen gases ($H_2$ 30%, N2 70%) and washed.

COMPARATIVE EXAMPLE 2

An activated carbon was manufactured in the same manner as in Example 1, except that the activated carbon was heat-treated in a nitrogen gas atmosphere and washed.

Experimental Example

BET specific surface areas and electrical conductivity of the activated carbons manufactured in Examples 1 and 2 and Comparative Examples 1 and 2 were measured, a metal concentration was measured by an ICP analysis, an oxygen concentration was measured by an EA analysis, and measurement results are shown in Table 1 below.

TABLE 1

| | Example 1 | | Example 2 | | Comparative Example 1 | | Comparative Example 2 | |
|---|---|---|---|---|---|---|---|---|
| | Before heat treatment and washing | After heat treatment and washing | Before heat treatment and washing | After heat treatment and washing | Before heat treatment and washing | After heat treatment and washing | Before heat treatment and washing | After heat treatment and washing |
| Oxygen content (wt %) | 11 | 0.8 | 11 | 1.0 | 11 | 2.0 | 11 | 2.8 |
| Metal content (ppm) | 102 | 18 | 102 | 19 | 102 | 90 | 102 | 98 |
| BET specific surface area (m$^2$/g) | 840 | 801 | 840 | 798 | 840 | 778 | 840 | 618 |

Referring to Table 1 and FIG. 2, it may be confirmed that in an example, by applying the HCl gas, a ratio of a decrease in the specific surface area before and after a heat treatment and washing is low and the oxygen concentration and the metal concentration are reduced. On the other hand, it may be confirmed that in Comparative Example 1, a ratio of a decrease in the specific surface area is reduced but a metal removal rate is reduced. Also, it may be confirmed that in Comparative Example 2, the specific surface area is reduced by 20% or greater.

Table 2 shows a change in a content of metal impurities after a heat treatment based on a concentration of HCl, using a concentration of metal impurities by the ICP analysis.

TABLE 2

| | Example 1 | Example 3 | Example 4 | Example 5 | Example 6 |
|---|---|---|---|---|---|
| HCl content (%) | 20% | 10% | 30% | 40% | 60% |
| Metal content (ppm) | 18 | 19 | 19 | 20 | 30 |

Referring to Table 2, it may be confirmed that when the HCl content is 40% or less, the concentration of metal impurities is 20 ppm or less, and it may be confirmed that when the HCl content increases to 60%, a ratio of a reduction in the concentration of metal impurities is low.

It will be apparent to those skilled in the art that various modifications and variations can be made from the foregoing descriptions. For example, adequate effects may be achieved even if the foregoing processes and methods are carried out in different order than described above, and/or the aforementioned elements are combined or coupled in different forms and modes than as described above or be substituted or switched with other components or equivalents. Thus, other implementations, alternative embodiments and equivalents to the claimed subject matter are construed as being within the appended claims.

The invention claimed is:

1. A method for manufacturing an activate carbon for an electrode material, the method comprising:
   preparing a carbon material;
   carbonizing the carbon material;
   mixing the carbonized carbon material and an activator;
   activating the carbonized carbon material having the activator mixed therein;
   washing and drying the activated carbon material; and
   heat-treating the activated carbon material in an atmosphere containing a chlorine-containing gas, after the washing and drying of the activated carbon material,
   wherein a content of metal impurities in the activated carbon material after the heat-treating of the activated carbon material ranges from 0.1 ppm to less than or equal to 20 ppm, and
   wherein a specific surface area of the activated carbon material after the heat-treating of the activated carbon material is reduced by 20% or less in comparison to the specific surface area of the activated carbon material before the heat-treating of the activated carbon material.

2. The method of claim 1, wherein in the mixing of the carbonized carbon material and the activator, the activator is an alkali hydroxide and is added in a weight ratio of 1 to 5 based on the carbonized carbon material.

3. The method of claim 1, wherein the activating of the carbonized carbon material is performed at an activation temperature of 500° C. to 1000° C.

4. The method of claim 1, wherein after the activating of the carbonized carbon material, a content of the activator in the carbonized carbon material is 500 ppm or less.

5. The method of claim 1, wherein the washing and drying of the activated carbon material is performed by at least one method selected from the group consisting of acid washing, distilled water washing, and inert gas washing.

6. The method of claim 1, wherein the washing and drying of the activated carbon material comprises drying the activated carbon material at a temperature of 50° C. to 200° C.

7. The method of claim 1, wherein after the washing and drying of the activated carbon material, pH of the activated carbon material ranges from 6.5 to 7.5.

8. The method of claim 1, wherein the chlorine-containing gas comprises at least one selected from the group consisting of HCl, $Cl_2$, $CHCl_3$, $ClO_2$, $BCl_3$, $SiCl_4$, $CCl_4$, $CHCl_3$, $COCl_2$, $CHCl_3$, and $CH_2Cl_2$.

9. The method of claim 1, wherein:
the chlorine-containing gas is mixed with an inert gas to form an atmosphere, and
the chlorine-containing gas is included in an amount of 1 to 50% by volume in gases forming the atmosphere.

10. The method of claim 1, wherein the heat-treating of the activated carbon material is performed at a temperature of 500° C. to 1000° C.

11. The method of claim 1, further comprising, after the carbonizing of the carbon material:
grinding the carbonized carbon material to an average particle size of 3 μm to 20 μm.

12. The method of claim 1, wherein a content of oxygen in the activated carbon material after the heat-treating of the activated carbon material is 1% or less.

\* \* \* \* \*